July 6, 1948.   R. W. COBEAN   2,444,767
GAS-ARC WELDING APPARATUS
Filed May 29, 1944

Inventor:
Richard W. Cobean,
by Harry E. Dunham
His Attorney.

Patented July 6, 1948

2,444,767

UNITED STATES PATENT OFFICE 2,444,767

GAS-ARC WELDING APPARATUS

Richard W. Cobean, Schenectady, N. Y., assignor to General Electric Company, a corporation of New York Application May 29, 1944, Serial No. 537,789

2 Claims. (Cl. 219—14)

My invention relates to gas-arc welding apparatus adapted to be held and manipulated by a welder and commonly referred to as a torch or an electrode holder for gas shielded arc welding.

In gas shielded arc welding an atmosphere of desired character is supplied to and about the welding arc and the portions of the work rendered molten thereby. The arc may be established between a plurality of electrodes or between an electrode and the work.

When welding readily oxidizable metals such as magnesium, aluminum, or alloys containing a substantial amount of either of these metals, it is desirable to establish the arc between the work and a substantially non-consuming electrode such as tungsten or carbon and surround the arc and molten portions of the work with an inert atmosphere such as helium or argon. Furthermore, when welding complicated assemblies such as airplane structures, it is desirable to have a well-balanced torch of small size and light weight which is fully insulated so that in confined places the welder may readily manipulate the torch without undue fatigue and without danger of damaging the work or the torch due to short circuits between the torch and the work. A fully insulated torch also protects the welder from the danger of accidental shock.

It is an object of my invention to provide a well-insulated light weight gas-arc torch of improved construction which is particularly suited for welding readily oxidized metals in atmospheres of argon or helium.

It is a further object of my invention to reduce the size of the handle structure of a light weight gas-arc torch by embodying therein an improved valve structure having an operating member conveniently located beneath the thumb of the operator's hand within which the handle of the torch is comfortably supported to obtain that balance of the torch which facilitates the welding operation.

Further objects of my invention will become apparent from a consideration of the following description of the embodiment thereof illustrated in the accompanying drawing.

Figure 1:
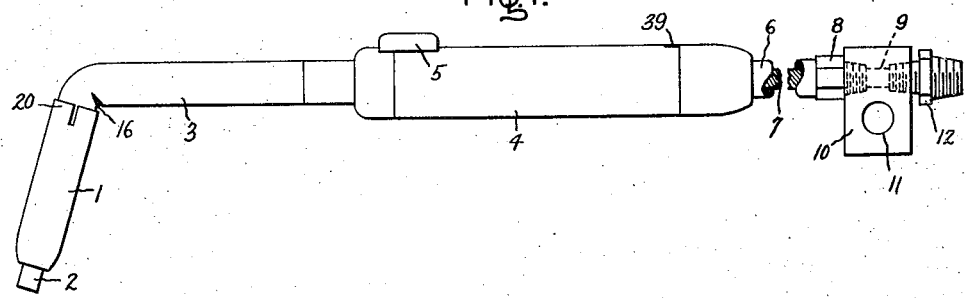

In this drawing, Fig. 1 is a side view of a gas-arc torch embodying my invention. It has been illustrated as embodying one of a plurality of interchangeable nozzles which are supported in a common handle through which gas is supplied to the nozzles and electricity to the electrodes held therein. The structural details of each electrode holding nozzle of this gas-arc torch have been illustrated in Fig. 2 which is a side sectional view thereof. The structural details of the handle of this torch have been illustrated in Fig. 3 which is a side sectional view thereof.

The gas-arc torch illustrated in the drawing comprises a plurality of interchangeable nozzles each of which is proportioned to support an electrode of different size and supply gas to and about its arcing terminal. Each nozzle, which is selected in accordance with the welding operation to be performed, may be supported in a common handle by gas-tight electrically conductive plug and socket joints having smooth frusto-conical contact making surfaces which, irrespective of wear, insure a firm support for the nozzles and a gas-tight arcless electrical contact between these nozzles and the handle of the torch. Each electrode holding nozzle is provided with a shank structure comprising integral concentric inner and outer metallic tubes which are electrically insulated from one another and have an elbow bend intermediate their ends which positions the nozzle at the desired angle to the torch handle. The outer tube of the nozzle shank is notched at the inner curve of the elbow bend therein to remove surplus metal which would otherwise prevent the formation of said elbow bend to the desired curvature.

The handle structure of this gas-arc torch embodies an improved valve structure having an operating member conveniently located beneath the thumb of the operator's hand within which the handle of the torch is gripped. This valve structure comprises a resilient tube located within and extending lengthwise of the handle. A slide also located within the handle and movable lengthwise thereof by the operating member above referred to, controllably flattens this resilient tube and thereby controls the size of the gas passageway therethrough. Gas is supplied to the plug and socket connection at the front end of the handle through this resilient tube and a suitable electrical connection also enclosed within the handle of the torch.

The gas-arc torch shown in Fig. 1 is provided with a nozzle 1 which encloses a holder for an electrode 2 which projects from the discharge end of the nozzle. The other end of the nozzle is closed by and frictionally supported on one end of a nozzle shank 3 whose other end is plugged into a socket in the front end portion of the handle 4 of the torch. Gas is supplied to the nozzle through the nozzle shank and a valve enclosed within the handle and electricity is supplied to the electrode holder within the nozzle and to the electrode supported therein through the nozzle shank and electrical connections also enclosed within the handle. The valve within the handle is operated by a thumb button 5 mounted at the front end portion of the handle.

Gas is supplied to the valve within handle 4 of the torch through a flexible hose 6 which encloses flexible electrical conductors 7. The end of this hose remote from the torch is provided with an electrically conductive coupling 8 to which conductors 7 are electrically connected and through which gas is supplied to the hose. This coupling is threaded into one end of a gas passageway 9 extending through a terminal block 10 which is formed of electrically conductive material and has a bolt hole 11 for attachment to one terminal of a suitable source of arc welding current. A coupling 12 threaded into the other end of gas passageway 9 in terminal block 10 is provided for supplying gas thereto.

Figure 2:
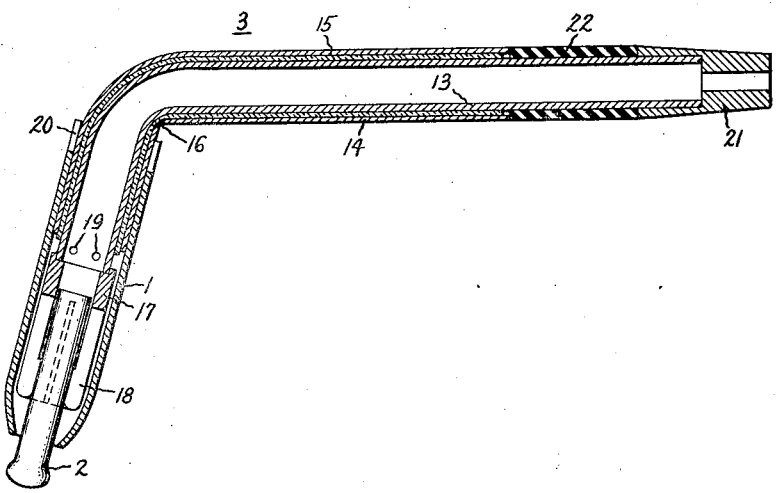

The construction of the electrode holding gas nozzle and shank therefor is fully illustrated in Fig. 2. The nozzle shank is formed of integral, concentric inner and outer metallic tubes 13 and 14 which are electrically insulated from one another by a tube of insulating material 15. The outer tube 14 may be formed of some wear-resistant metal, such as low carbon steel and the inner tube 13 may be formed of a metal having low electrical resistance such as copper. The tube of insulating material 15 may be formed of glass tape which is wound on the outside surface of the inner tube and secured thereto by means of a suitable adhesive, such as water-glass. It will be noted that the inner tube is longer than the outer tube and that its ends project beyond the ends of the outer tube.

The nozzle shank is initially formed of straight tubes which are assembled one over the other with the desired layer of insulating material therebetween. As previously stated, this insulating material may be formed of glass tape wrapped about and secured along its inner surface to the outside surface of the inner tube 13 by a layer of water-glass. Sufficient overlap should be provided between the turns of the glass tape so that a snug fit is obtained when outer tube 14 is fitted over inner tube 13 and insulating tube 15 formed thereon by this glass tape. In view of the fact that the assembly is to be bent, care should be exercised that the overlapping turns of the insulating glass tape are not attached to one another. Care should also be exercised to prevent any foreign material, such as chips, grit, dirt, and the like, from accumulating on or being included between the overlapped turns of this glass tape which is provided for electrically insulating the inner tube from the outer tube.

After the above assembly has been made, the inner tube is filled with a molten metal, such as lead, which is then allowed to cool. The assembly is then bent to the configuration illustrated in the drawing. In order to prevent undue flattening of the inner tube and the formation of wrinkles in the outer tube, the outer tube is V-notched at 16 where the inner curve of the elbow bend is formed. The edges of the V-notch are preferably rounded so that they will not cut into the glass tape when the assembly is bent at the notched portion of the outer tube to form the elbow bend in the nozzle shank. This notch is best shown in Fig. 1 at 16. The outside surface of the outer tube may then be coated with a thin layer of insulating material, such as Glyptal, which is set by baking. The lead filling used when bending the nozzle shank may be melted out of it at the same time that the Glyptal coating on the outside surface of the nozzle shank is being baked.

Electrode 2 located in nozzle 1 is held by a collet 17 which may be formed of high speed steel. As shown in the drawing, the cylindrical exterior surface of the electrode is engaged and held by a plurality of spring fingers 18 forming an integral part of one end of this collet whose other end is electrically attached to the projecting end portion of inside tube 13 of the nozzle shank. This attachment may be obtained by seating the projecting end of tube 13 in a recess formed in the end of collet 17 and joining the parts by means of brazing. It will be noted that the projecting end of the inner tube of the nozzle shank is provided with side wall openings 19 through which gas may be supplied from the passageway in this tube to the interior of the nozzle.

Nozzle 1 is preferably formed of metal, such as stainless steel. Its inner end is closed by the end of the nozzle shank with which it makes a frictional engagement with the outside end surface of tube 14 thereof. For this purpose the inside end of the nozzle may be provided with slots to form spring fingers 20 which will insure a satisfactory frictional engagement between it and the end of the nozzle shank. The outer end of the nozzle is provided with an opening through which the electrode located in holder 17 may project.

It will be noted that by reason of the construction illustrated, electrode 2 is longitudinally adjustable in its holder 17 and that nozzle 1 is longitudinally adjustable along the end of nozzle shank 3 upon which it is supported. As the electrode is consumed, nozzle 1 may be pushed back along the nozzle shank to maintain a desired extension of the electrode through the opening in the nozzle. When the nozzle has been pushed back as far as it will go, the electrode may be pulled out of its holder and the nozzle moved in the same direction along the nozzle shank in order to obtain again the desired adjustment of these parts. It will be noted that the metallic nozzle is supported on the nozzle shank through the agency of outer tube 14 thereof which is electrically insulated from the inner tube 13 through which electricity is supplied to the electrode holder. Consequently, the only live part of the nozzle assembly is the electrode extending from the nozzle.

The other projecting end of inner tube 13 of the nozzle shank is provided with a smooth walled frustro-conical plug 21 having a gas passageway extending lengthwise therethrough from end to end. The outer end of this plug is of smaller diameter than its inner end which is provided with a socket enclosing and electrically attached as by soldering or brazing to the end of inner tube 13 of the nozzle shank. The portion of inner tube 13 between the inner end of plug 21 and the adjacent outer end of outer tube 14 of the nozzle shank is electrically insulated by a sleeve 22 of suitable insulating material, such as Textolite, which is a phenolic, thermosetting plastic with a cloth base. This sleeve will, of course, be placed about the projecting end of tube 13 before plug 21 is assembled therein and attached thereto.

Figure 3:
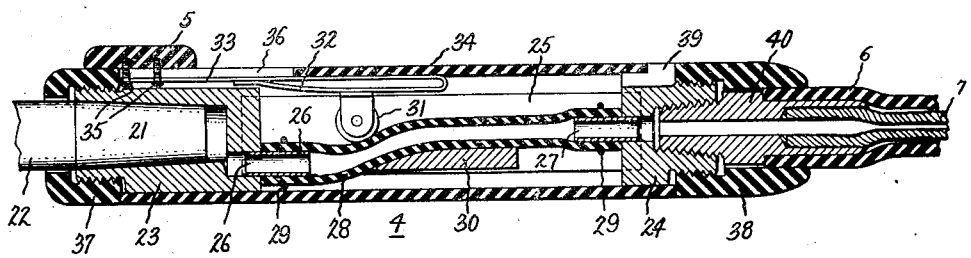

As shown in Fig. 3, plug 21 of the nozzle shank forms a gas-tight frictional fit with a mating frustro-conical socket located in the front end support 23 of the handle frame. This handle frame also includes a rear end support 24 the inner end of which is attached to the inner end of end support 23 by two parallel bars 25. The end supports 23 and 24 may be formed of a metal, such as brass, and the bars 25 of a similar metal, such as copper.

Each of the end supports has a longitudinal gas passageway extending therethrough. The gas passageway through the front end support communicates with the frustro-conical socket formed therein. The inner ends of the gas passageways in these end frames are provided with nipples 26 and 27 which may be formed of steel. These nipples are connected by a resilient tube 28 having its ends enclosing and frictionally engaging their projecting ends. The ends of tube 28 may also be secured to the projecting ends of these nipples by suitable fastening means such as the tie wires or spring clamps 29 illustrated in the drawing. Tube 28 may be formed of live rubber, a rubber substitute or some similar material. The midportion of this tube rests upon a bridge 30 attached to and supported between parallel bars 25 of the handle frame. It will be noted that the tube supporting surface of this bridge is provided with an inclined or camming surface.

The amount of gas supplied to the nozzle of the torch is determined by controllably flattening resilient tube 28 against member 30 through the agency of a roller 31. This roller is mounted on a spring loop 32 forming part of the inner end of a slide 33 having one side thereof frictionally engaging the inside surface of the tubular grip 34 of the torch handle. The thumb button 5 previously referred to is attached to the front end of slide 33, by means of screws 35 which extend through a slot 36 formed in the other end portion of handle grip 34 and extending part way along its length. Thumb button 5 and grip 34 may be formed of a suitable electrically insulating material such as Textolite.

By reason of the arrangement illustrated and described it is apparent that movement of slide 33 lengthwise of the torch handle will cause roller 31 to ride along the length of resilient tube 28 supported on bridge 30 of the handle frame. Due to the inclined surface of this bridge and the rectilinear movement of the roller, resilient tube 28 may be controllably flattened to control the size of the gas passageway therethrough. It is also apparent that by reason of the arrangement of parts illustrated roller 31 will be held in any position to which it is moved so that any desired flow of gas between shutoff and full-on may be obtained.

The valve structure embodying resilient tube 28 and the operating members associated therewith are all enclosed within the handle of the torch by cylindrical hand grip 34. This hand grip is held in position on the handle frame by collar nuts 37 and 38 which are threaded on projecting end portions of the end supports 23 and 24 of the handle frame so that the inner ends of the nuts engage the outer ends of the hand grip. These nuts like the hand grip are preferably formed of an electrically insulating material such as Textolite. Before the assembly is completed by securing nuts 37 and 38, hand grip 34 may be moved to the right of the handle frame so that the valve slide assembly may be inserted within the hand grip. Thereafter the hand grip may be slid forward on the frame in order to introduce a key 39 by which hand grip 34 is locked against rotation about the longitudinal axis of the handle frame and the frustro-conical socket formed in its front end portion. Thereafter, the parts are moved to the position illustrated in the drawing and nuts 37 and 38 secured to end supports 23 and 24 of the handle frame in order to complete the assembly.

Gas and electricity are supplied to end support 24 of the torch handle through the gas hose 6 and conductors 7, previously referred to in describing Fig. 1. The handle end of this hose is closed by a plug 40 of electrically conductive material having an end portion threaded into a socket in the outer end of end support 24. This plug is provided with a gas passageway which extends from the interior of hose 6 to the gas passageway in end support 24. The ends of conductors 7 are joined to this plug 40 in a socket formed in its outer end portion over the exterior surface of which the end of hose 6 is forced and held in frictional engagement therewith.

It is thus apparent that electricity is supplied from terminal block 10 through fitting 8, conductors 7 in hose 6, and terminal block 40 to end frame 24 of the torch handle. Current flows through the handle frame from end support 24 to end support 23 through connecting bars 25 and the plug and socket joint between end frame 23 and nozzle shank 3 supplies current through the inner tube 13 of the nozzle shank to the electrode holding collet which in turn supplies it to electrode 2 located therein.

Gas is supplied from a suitable source through fitting 12, gas passageway 9 in terminal block 10, the gas passageways in fitting 8, hose 6, and plug 40, and the gas passageways through end supports 23 and 24 and flexible tube 28 connecting these passageways, to the nozzle socket in end support 23 of the handle frame. Thence it is supplied through the gas passageways in plug 21 and tube 13 of nozzle shank 3 to the interior of nozzle 1.

The torch above described is prepared for a welding operation by inserting in its handle a nozzle proportioned to support an electrode of proper size for the current values used in performing the welding operation. Terminal block 11 is connected to one terminal of a suitable source of arc welding current whose other terminal is connected to the work to be welded. The fitting 12 forming part of the terminal block is also connected to a suitable source of gas supply. If the gas is obtained from a high pressure tank, a suitable pressure regulator including a high pressure gauge should be fastened to the tank to indicate gas remaining in the tank and either a low pressure gauge to read output pressure or a flowmeter to indicate output flow in cubic feet per hour or equivalent units should be connected between the tank and fitting 12. When using argon or helium supplied from such pressure tanks the pressure regulator may be set at about three pounds per square inch. When enough welding has been done to heat the nozzle of the torch, the initial regulator setting may be reduced since the heat generated by the arc heats the nozzle and the gas supplied therethrough, causing the gas to expand and give better protection from oxidation with the same pressure setting.

The valve in the torch handle may then be open and after sufficient gas has flown to purge the gas passageways leading to the nozzle of the torch, the welding arc may be struck by lightly tapping or brushing the electrode against the work and quickly drawing it back a short distance.

During welding a filler rod may be used in the same manner usually employed in atomic hydrogen arc welding or in gas welding. When a molten pool is formed in the work the end of the filler rod should be advanced into the arc preferably at the lower end of the electrode. As the filler rod is advanced into the arc and a piece melted off, the arc should also be moved along the seam forming a continuous weld with a bead of any desired size. The filler rod should be held at as near a right angle to the electrode as convenient since, if the angle between the rod and the electrode is 60° or less, the filler rod will be excessively heated by radiation from the arc and the electrode and may melt outside the arc area, causing an excessively large and uneven head and poor penetration. The elbow bend in the nozzle shank is of proper angularity to facilitate this operation.

During welding, the valve in the handle may be controlled by operating thumb button 5. For example, for purposes of economy it is desirable to reduce the flow of gas when welding in corners or depressions. When a weld has been completed and welding current interrupted, the flow of gas should be maintained for a few seconds until the electrode cools in order to prevent excessive oxidation and consequent consumption of the electrode. The valve in the handle may be used for shutting off the gas at the end of a welding operation and it is not necessary consequently to employ the pressure regulator at the source of gas supply for accomplishing this result.

With adequate gas shielding, electrode consumption is at a very low rate and the length of electrode which it is possible to enclose in the nozzle is adequate for many hours or even many days of welding. Preferably, this electrode is made of tungsten although, as previously noted, a tungsten substitute or a carbon electrode may be used. During welding the end of the electrode becomes semi-molten and assumes a configuration such as shown in Fig. 2. The configuration of the electrode shown in Fig. 1 is that of a new electrode which has not yet been used for welding.

The adjustment of the electrode in its holder and the adjustment of the nozzle relative to the arcing terminal of the electrode is of considerable importance. If the arcing terminal of the electrode does not extend a suitable distance through the opening in the nozzle, the nozzle may be overheated whereas if the extension is greater than necessary for visibility and clearness to the work, an excessive amount of gas may be required for adequate protection of the work. As the electrode is used, the nozzle may be pushed back to maintain the desired electrode extension. When the nozzle has been pushed back as far as it will go, the electrode may be pulled out of its holder by gripping it with pliers, using straight twisting motion, until it again extends a correct distance beyond the spring collet and the nozzle readjusted on the nozzle shank to reestablish desired operating conditions.

Although the several features of my torch above described are particularly valuable when embodied in a light weight torch for use in gas-arc welding operations, it is apparent that the several features thereof may also be employed in torches of larger size as well as in torches adapted for other uses.

In view of the above description of one embodiment of my invention, many variations and modifications thereof will occur to those skilled in the art to which it relates and I, therefore, aim to cover by the appended claims all such modifications within the true spirit and scope of my invention.

What I claim as new and desire to secure by Letters Patent of the United States is:

1. A handle for supporting and supplying gas and electric current to the electrode holding nozzle of a gas-arc torch, said handle comprising a frame having a gas passageway extending through its nozzle supporting front end portion, a hand grip mounted on and enclosing said frame and having a longitudinal slot in its front end portion, a resilient tube within and extending lengthwise of said hand grip, said tube having its front end portion connected with said gas passageway in said frame, a slide having one side thereof frictionally engaging the inside surface of said hand grip and having one end thereof bent back upon itself along its other side to form a spring loop, an operating member mounted on the other end of said slide and extending through said slot in said hand grip, a roller mounted on said spring loop of said slide for movement with said slide along one side of and against said resilient tube, a supporting surface within said hand grip and extending lengthwise along the other side of said resilient tube and inclined to the path of travel of said roller and said slide upon it which is mounted so that movement of said slide and said roller lengthwise of said handle controls the flattening of said resilient tube between said roller and said inclined surface, and means for supplying gas to the other end of said resilient tube.

2. A handle for supporting and supplying gas and electric current to the electrode holding nozzle of a gas-arc torch, said handle comprising an electrically conductive frame formed of spaced parallel bars connected at their ends by front and rear end supports each of which has a gas passageway extending lengthwise therethrough, connecting means for supplying arc welding current to said rear end support of said frame and for supplying gas to said passageway extending therethrough, a resilient tube located between said bars of said frame and connecting the gas passageways through said end supports of said frame, a hand grip mounted on said end supports of said frame and having a slot in its front end portion extending lengthwise of said resilient tube, means for attaching said hand grip to said frame and securing it against rotation relative thereto about its longitudinal axis, a slide having one side thereof frictionally engaging the inside surface of said hand grip, an operating member mounted on said slide and extending through said slot in said hand grip, a spring biased roller mounted on the other side of said slide and movable therewith along one side of said resilient tube, and a support extending lengthwise along the other side of said resilient tube and mounted on and between said bars of said frame, the tube engaging surface of said support and the path of travel of said roller being inclined to one another to control the flattening of said tube and the gas flow therethrough in response to movement of said roller along said resilient tube.

RICHARD W. COBEAN.

REFERENCES CITED

The following references are of record in the file of this patent:

UNITED STATES PATENTS

| Number | Name | Date |
| --- | --- | --- |
| 114,981 | Shoenberger | May 16, 1871 |
| 902,942 | Craig | Nov. 3, 1908 |
| 1,031,710 | Hanaman | July 9, 1912 |
| 1,534,688 | Collins | Apr. 21, 1925 |
| 1,879,631 | Mott et al. | Sept. 27, 1932 |
| 1,959,074 | Bloxsom | May 15, 1934 |
| 2,014,226 | Catlett | Sept. 10, 1935 |
| 2,314,628 | Pavlecka | Mar. 23, 1943 |
| 2,376,265 | Meredith | May 15, 1945 |